United States Patent
Adams (10) Patent No.: US 9,442,668 B1
(45) Date of Patent: Sep. 13, 2016

(54) ADAPTIVE POWER MANAGEMENT CONTROL WITH PERFORMANCE FEEDBACK

(71) Applicant: Western Digital Technologies, Inc., Irvine, CA (US)

(72) Inventor: Donald E. Adams, Pleasanton, CA (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 255 days.

(21) Appl. No.: 14/090,117

(22) Filed: Nov. 26, 2013

Related U.S. Application Data (60) Provisional application No. 61/871,809, filed on Aug. 29, 2013.

(51) Int. Cl.
*G06F 3/06* (2006.01)
*G06F 1/32* (2006.01)

(52) U.S. Cl.
CPC ........... *G06F 3/0625* (2013.01); *G06F 1/3268* (2013.01); *G06F 3/0659* (2013.01); *G06F 3/0683* (2013.01)

(58) Field of Classification Search
CPC ........................... G06F 3/0625; G06F 1/3268
See application file for complete search history.

(56) References Cited

U.S. PATENT DOCUMENTS

| | | | |
|---|---|---|---|
| 5,517,649 A | 5/1996 | McLean | |
| 5,666,538 A * | 9/1997 | DeNicola | G06F 1/3221 709/217 |
| 5,682,273 A | 10/1997 | Hetzler | |
| 5,774,292 A * | 6/1998 | Georgiou | G06F 1/3221 360/63 |
| 5,905,901 A | 5/1999 | Klein | |
| 5,913,067 A | 6/1999 | Klein | |
| 5,954,820 A | 9/1999 | Hetzler | |
| 6,845,456 B1 | 1/2005 | Menezes et al. | |
| 6,856,556 B1 | 2/2005 | Hajeck | |
| 6,892,313 B1 | 5/2005 | Codilian et al. | |
| 7,126,857 B2 | 10/2006 | Hajeck | |
| 7,206,948 B2 * | 4/2007 | Brauer | G06F 1/3203 713/300 |
| 7,231,198 B2 | 6/2007 | Loughran | |
| 7,254,721 B1 | 8/2007 | Tobias et al. | |
| 7,275,166 B2 | 9/2007 | Kaiju et al. | |
| 7,425,810 B2 | 9/2008 | Hobbet et al. | |
| 7,430,136 B2 | 9/2008 | Merry, Jr. et al. | |
| 7,447,807 B1 | 11/2008 | Merry et al. | |
| 7,502,256 B2 | 3/2009 | Merry, Jr. et al. | |
| 7,509,441 B1 | 3/2009 | Merry et al. | |
| 7,552,347 B2 | 6/2009 | Schutte | |
| 7,596,643 B2 | 9/2009 | Merry, Jr. et al. | |
| 7,647,513 B2 | 1/2010 | Tobias et al. | |

(Continued)

OTHER PUBLICATIONS

Huayuan Chen, U.S. Appl. No. 14/024,498, filed Sep. 11, 2013, 19 pages.

(Continued)

*Primary Examiner* — Jaweed A Abbaszadeh
*Assistant Examiner* — Cheri Harrington (57) ABSTRACT

Adaptive power management for a data storage device (DSD). A command rate is determined for service requests received by the DSD and a latency is determined for the DSD in performing service requests. The command rate and the latency are used to determine a probability of receiving no service requests within a time interval and power states of the DSD are managed based on the probability of receiving no service requests.

15 Claims, 12 Drawing Sheets

(56) References Cited

U.S. PATENT DOCUMENTS

| | | | |
|---|---|---|---|
| 7,653,778 B2 | 1/2010 | Merry, Jr. et al. | |
| 7,685,337 B2 | 3/2010 | Merry, Jr. et al. | |
| 7,685,338 B2 | 3/2010 | Merry, Jr. et al. | |
| 7,685,374 B2 | 3/2010 | Diggs et al. | |
| 7,733,712 B1 | 6/2010 | Walston et al. | |
| 7,765,373 B1 | 7/2010 | Merry et al. | |
| 7,856,563 B1* | 12/2010 | Sade | G06F 1/3215 713/300 |
| 7,898,855 B2 | 3/2011 | Merry, Jr. et al. | |
| 7,912,991 B1 | 3/2011 | Merry et al. | |
| 7,936,603 B2 | 5/2011 | Merry, Jr. et al. | |
| 7,962,792 B2 | 6/2011 | Diggs et al. | |
| 8,078,918 B2 | 12/2011 | Diggs et al. | |
| 8,090,899 B1 | 1/2012 | Syu | |
| 8,095,851 B2 | 1/2012 | Diggs et al. | |
| 8,108,692 B1 | 1/2012 | Merry et al. | |
| 8,122,185 B2 | 2/2012 | Merry, Jr. et al. | |
| 8,127,048 B1 | 2/2012 | Merry et al. | |
| 8,135,903 B1 | 3/2012 | Kan | |
| 8,151,020 B2 | 4/2012 | Merry, Jr. et al. | |
| 8,161,227 B1 | 4/2012 | Diggs et al. | |
| 8,166,245 B2 | 4/2012 | Diggs et al. | |
| 8,243,525 B1 | 8/2012 | Kan | |
| 8,254,172 B1 | 8/2012 | Kan | |
| 8,261,012 B2 | 9/2012 | Kan | |
| 8,286,018 B2* | 10/2012 | Chang | G06F 1/3268 711/113 |
| 8,296,625 B2 | 10/2012 | Diggs et al. | |
| 8,312,207 B2 | 11/2012 | Merry, Jr. et al. | |
| 8,312,214 B1* | 11/2012 | English | G06F 1/206 711/111 |
| 8,316,176 B1 | 11/2012 | Phan et al. | |
| 8,341,339 B1 | 12/2012 | Boyle et al. | |
| 8,375,151 B1 | 2/2013 | Kan | |
| 8,392,635 B2 | 3/2013 | Booth et al. | |
| 8,397,107 B1 | 3/2013 | Syu et al. | |
| 8,407,449 B1 | 3/2013 | Colon et al. | |
| 8,423,722 B1 | 4/2013 | Deforest et al. | |
| 8,433,858 B1 | 4/2013 | Diggs et al. | |
| 8,443,167 B1 | 5/2013 | Fallone et al. | |
| 8,447,920 B1 | 5/2013 | Syu | |
| 8,458,435 B1 | 6/2013 | Rainey, III et al. | |
| 8,478,930 B1 | 7/2013 | Syu | |
| 8,489,854 B1 | 7/2013 | Colon et al. | |
| 8,503,237 B1 | 8/2013 | Horn | |
| 8,521,972 B1 | 8/2013 | Boyle et al. | |
| 8,549,236 B2 | 10/2013 | Diggs et al. | |
| 8,583,835 B1 | 11/2013 | Kan | |
| 8,601,311 B2 | 12/2013 | Horn | |
| 8,601,313 B1 | 12/2013 | Horn | |
| 8,612,669 B1 | 12/2013 | Syu et al. | |
| 8,612,804 B1 | 12/2013 | Kang et al. | |
| 8,615,681 B2 | 12/2013 | Horn | |
| 8,638,602 B1 | 1/2014 | Horn | |
| 8,639,872 B1 | 1/2014 | Boyle et al. | |
| 8,683,113 B2 | 3/2014 | Abasto et al. | |
| 8,700,834 B2 | 4/2014 | Horn et al. | |
| 8,700,950 B1 | 4/2014 | Syu | |
| 8,700,951 B1 | 4/2014 | Call et al. | |
| 8,706,985 B1 | 4/2014 | Boyle et al. | |
| 8,707,104 B1 | 4/2014 | Jean | |
| 8,713,066 B1 | 4/2014 | Lo et al. | |
| 8,713,357 B1 | 4/2014 | Jean et al. | |
| 8,719,531 B2 | 5/2014 | Strange et al. | |
| 8,724,422 B1 | 5/2014 | Agness et al. | |
| 8,725,931 B1 | 5/2014 | Kang | |
| 8,745,277 B2 | 6/2014 | Kan | |
| 8,751,728 B1 | 6/2014 | Syu et al. | |
| 8,769,190 B1 | 7/2014 | Syu et al. | |
| 8,769,232 B2 | 7/2014 | Suryabudi et al. | |
| 8,775,720 B1 | 7/2014 | Meyer et al. | |
| 8,782,327 B1 | 7/2014 | Kang et al. | |
| 8,788,778 B1 | 7/2014 | Boyle | |
| 8,788,779 B1 | 7/2014 | Horn | |
| 8,788,880 B1 | 7/2014 | Gosla et al. | |
| 8,793,429 B1 | 7/2014 | Call et al. | |
| 2005/0108231 A1* | 5/2005 | Findleton | G06F 3/067 |
| 2005/0160221 A1* | 7/2005 | Yamazaki | G06F 1/3221 711/114 |
| 2006/0095686 A1* | 5/2006 | Miller | G06F 3/0611 711/151 |
| 2008/0104431 A1* | 5/2008 | Shimada | G06F 1/3221 713/300 |
| 2009/0113123 A1* | 4/2009 | Joukov | G06F 1/3221 711/112 |
| 2009/0254702 A1* | 10/2009 | Kumano | G06F 1/3203 711/112 |
| 2010/0174849 A1 | 7/2010 | Walston et al. | |
| 2010/0250793 A1* | 9/2010 | Syu | G11C 7/22 710/29 |
| 2010/0332882 A1* | 12/2010 | Nayak | G06F 3/0625 713/324 |
| 2011/0099323 A1 | 4/2011 | Syu | |
| 2011/0283049 A1 | 11/2011 | Kang et al. | |
| 2011/0283128 A1 | 11/2011 | Farhan et al. | |
| 2012/0260020 A1 | 10/2012 | Suryabudi et al. | |
| 2012/0278531 A1 | 11/2012 | Horn | |
| 2012/0284460 A1 | 11/2012 | Guda | |
| 2012/0324191 A1 | 12/2012 | Strange et al. | |
| 2013/0041875 A1* | 2/2013 | Kan | G06F 3/0625 707/705 |
| 2013/0132638 A1 | 5/2013 | Horn et al. | |
| 2013/0145106 A1 | 6/2013 | Kan | |
| 2013/0290793 A1 | 10/2013 | Booth et al. | |
| 2013/0347103 A1* | 12/2013 | Veteikis | H04L 43/04 726/22 |
| 2014/0059405 A1 | 2/2014 | Syu et al. | |
| 2014/0079170 A1* | 3/2014 | Le Houerou | H04L 7/0016 375/371 |
| 2014/0101369 A1 | 4/2014 | Tomlin et al. | |
| 2014/0115427 A1 | 4/2014 | Lu | |
| 2014/0133220 A1 | 5/2014 | Danilak et al. | |
| 2014/0136753 A1 | 5/2014 | Tomlin et al. | |
| 2014/0149826 A1 | 5/2014 | Lu et al. | |
| 2014/0157078 A1 | 6/2014 | Danilak et al. | |
| 2014/0181432 A1 | 6/2014 | Horn | |
| 2014/0223255 A1 | 8/2014 | Lu et al. | |
| 2014/0298117 A1* | 10/2014 | Ahmadi-Ardakani | G06F 11/0757 714/55 |
| 2015/0046653 A1* | 2/2015 | Soundararajan | G06F 12/0873 711/122 |

OTHER PUBLICATIONS

"Reinforcement Learning: A Tutorial"; Harmon and Harmon; Wright Laboratory, Wright-Patterson AFB, OH; 1997; available at http://oai.dtic.mil/oai/oai?verb=getRecord&metadataPrefix=html&identifier=ADA323194.

* cited by examiner

| Value for Avg[$L_k$] | Value for $B_2$ |
|---|---|
| Avg[$L_k$] >= 1 seconds/second | 0.125 (slow decay) |
| 0.5 <= Avg[$L_k$] < 1 | 0.250 |
| 0.1 <= Avg[$L_k$] < 0.5 | 0.375 |
| Avg[$L_k$] < 0.1 s/s | 0.500 (fastest decay) |

ADAPTIVE POWER MANAGEMENT CONTROL WITH PERFORMANCE FEEDBACK

CROSS-REFERENCE TO RELATED APPLICATION

This application claims the benefit of U.S. Provisional Application No. 61/871,809, filed on Aug. 29, 2013, which is hereby incorporated by reference in its entirety.

BACKGROUND

Data storage devices (DSDs) have various power modes or states varying in energy consumption. Using lower power modes reduces the amount of energy consumed, which is particularly helpful for extended use of battery operated systems. Performance is typically reduced in the lower power states. Managing when to transition to lower power states can mitigate performance reduction. In addition, there is an energy cost to transitioning between power states.

BRIEF DESCRIPTIONS OF THE DRAWINGS

The features and advantages of the implementations of the present disclosure will become more apparent from the detailed description set forth below when taken in conjunction with the drawings. The drawings and the associated descriptions are provided to illustrate implementations of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various implementations disclosed may be practiced without some of these specific details. In other instances, well-known structures and techniques have not been shown in detail to avoid unnecessarily obscuring the various implementations.

While the description herein refers generally to a solid state memory such as a NAND flash memory, it is understood that other implementations can include one or more of various types of solid state memory such as Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete non-volatile memory (NVM) chips, or any combination thereof.

Figure 1:
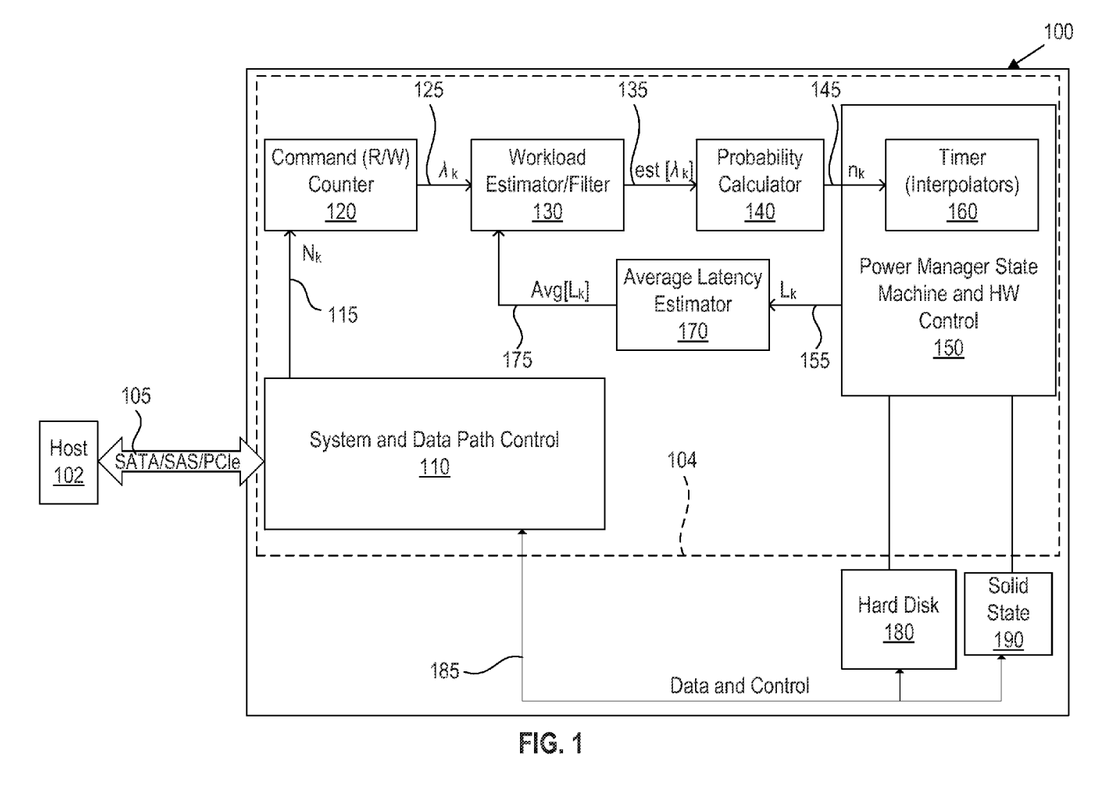
FIG. 1 presents a block diagram of a power management feedback system according to an implementation of the present disclosure.

FIG. 1 presents a conceptual block diagram of a DSD 100 and a host 102 according to an implementation of the present disclosure. The various blocks depicted in FIG. 1 may be implemented as separate hardware modules, or with existing components of a conventional DSD, such as logic on a controller or memory. Additionally, the description of the tasks and functions performed by each module/component below relates to an example configuration. In other configurations, the tasks and functions may be performed by other combinations of modules/components. For example, a single controller may be tasked to perform the various functions and tasks described below. In the example of FIG. 1, the DSD 100 is an SSHD which includes a controller 104, a hard disk 180 and a solid state memory 190.

A bus 105, which may be Serial ATA (SATA), Serially Attached SCSI (SAS), Peripheral Component Interconnect Express (PCIe), or other suitable protocol, links the DSD 100 to the host 102 which sends service requests. A system and data path control 110 manages data and commands to/from the DSD 100. The system and data path control 110 passes service requests from the host through the bus 105, and passes service requests ($N_k$) 115 to a command counter 120. The command counter 120 determines a command rate ($\lambda_k$) 125, which is passed to a workload estimator/filter 130. The workload estimator/filter 130 uses the command rate 125 and an average latency (avg[$L_k$]) 175 to determine an estimated command rate (est[$\lambda_k$]) 135, which is passed to a probability calculator 140. The probability calculator 140 uses the estimated command rate to determine a timer interpolation value ($n_k$) 145, which is passed to a timer 160 of a power manager state machine 150. The timer interpolation value 145 corresponds to a time within a specified time interval when a probability of receiving no commands within the specified time interval will reach a threshold probability.

The power manager state machine 150 increases efficiency by keeping the hard disk 180 and the solid state memory 190 in the lower power states. Although keeping the hard disk 180 and the solid state memory 190 in the lowest power states would be ideal to reduce energy consumption, performance suffers due to the added overhead of transitioning into active (higher power) states. The timer 160 delays the transition into lower power states until a predicted time, based on a desired or prescribed probability of no commands arriving. The power manager state machine uses the timer 160 to control transitioning between states. Providing feedback based on a command rate and latency in performing commands improves the workload estimation.

In one embodiment, the power manager state machine 150 provides feedback by passing a latency ($L_k$) 155 to an average latency estimator 170. The average latency estimator 170 uses the latency 155 to determine the average latency 175, which is passed to the workload estimator/filter 130. The power manager state machine 150 can control the power states of the hard disk 180 and the solid state memory 190. The hard disk 180 and the solid state memory 190 exchange data and control signals 185 with the system and data path control 110. The hard disk 180 may be a disk-based storage medium such as one or more magnetic recording platters. The solid state memory 190 may be a flash-based storage medium. In other implementations, the DSD 100 may not have either the hard disk 180 or the solid state memory 190, or may have additional storage mediums controlled by the power manager state machine 150.

In one embodiment, the workload estimator/filter 130 uses the command rate 125 and the average latency 175 to determine the estimated command rate 135. In one implementation, the workload estimator/filter 130 may use Equation 1 below when $\lambda_k$ is below a maximum rate, MaxR.

$$\text{est}[\lambda_k] = B_k * \lambda_k + (1-B_k) * \text{est}[\lambda_{k-1}] \quad \text{Equation 1}$$

where $B_k$ is a gain value such that $B_k=1$ when $\lambda_k >= \text{est}[\lambda_k]$ (when command rate is increasing), and $B_k = B_2$ otherwise (when command rate is decreasing), where $B_2$ determines how fast the rate should decay.

In one implementation, $B_2$ may be determined through one or more lookup tables based on $\text{avg}[L_k]$. For example, table 1 shows four discrete values, but in other implementations more or less values for $B_2$ may be used.

TABLE 1

| Value for Avg[$L_k$] | Value for $B_2$ |
|---|---|
| Avg[$L_k$] >= 1 seconds/second | 0.125 (slow decay) |
| 0.5 <= Avg[$L_k$] < 1 | 0.250 |
| 0.1 <= Avg[$L_k$] < 0.5 | 0.375 |
| Avg[$L_k$] < 0.1 s/s | 0.500 (fastest decay) |

The probability calculator 140 uses the estimated command rate 135 to determine the timer interpolation value 145. In one implementation the probability calculator 140 may use the following equation:

$$n_k = -T_s/(\alpha * dt) * (\text{est}[\lambda_k] * (T_{be}/\ln(P[0])) + 1) \quad \text{Equation 2}$$

where $n_k$ is set to 0 when $n_k < 0$ and $n_k$ is set to 1000 when $n_k > 1000$. In addition, a is set in Equation 2 so that $\alpha = B_2/(1-B_2)$ for relaxation control to meet a final value at $n*dt = T_s \sim 1$ second. In this example, dt can be a timer resolution such as 1 ms. $T_{be}$ is a break even time for the state transition. The break even time can represent an amount of time that would need to be spent at a lower power state to achieve an energy saving that is equal the amount of energy that will be needed to transition down to the lower state and transition up to an active state. P[0] is a target probability for state transition decisions, corresponding to a Poisson distribution value of no events occurring (e.g., that no service commands come in during the time interval). One example of such a target probability can be expressed as $\ln(P[0]=0.75)=-0.289$.

In other implementations, the timer interpolation value 145 may be determined through one or more lookup tables, using similar inputs and parameters.

The average latency estimator 170 uses feedback from the power manager state machine 150 to determine the average latency 175. In one implementation, the average latency estimator 170 may use the following equation:

$$\text{Avg}[L_k] = A * L_k + (1-A) * \text{Avg}[L_{k-1}] \quad \text{Equation 3}$$

where $L_k=0$ for no transition back to an active power state, $L_k=1x0$, for a resume latency for a state transition, and where A is a weight value between 0 and 1 inclusive, such as 0.5 to provide an average.

Figure 2A:
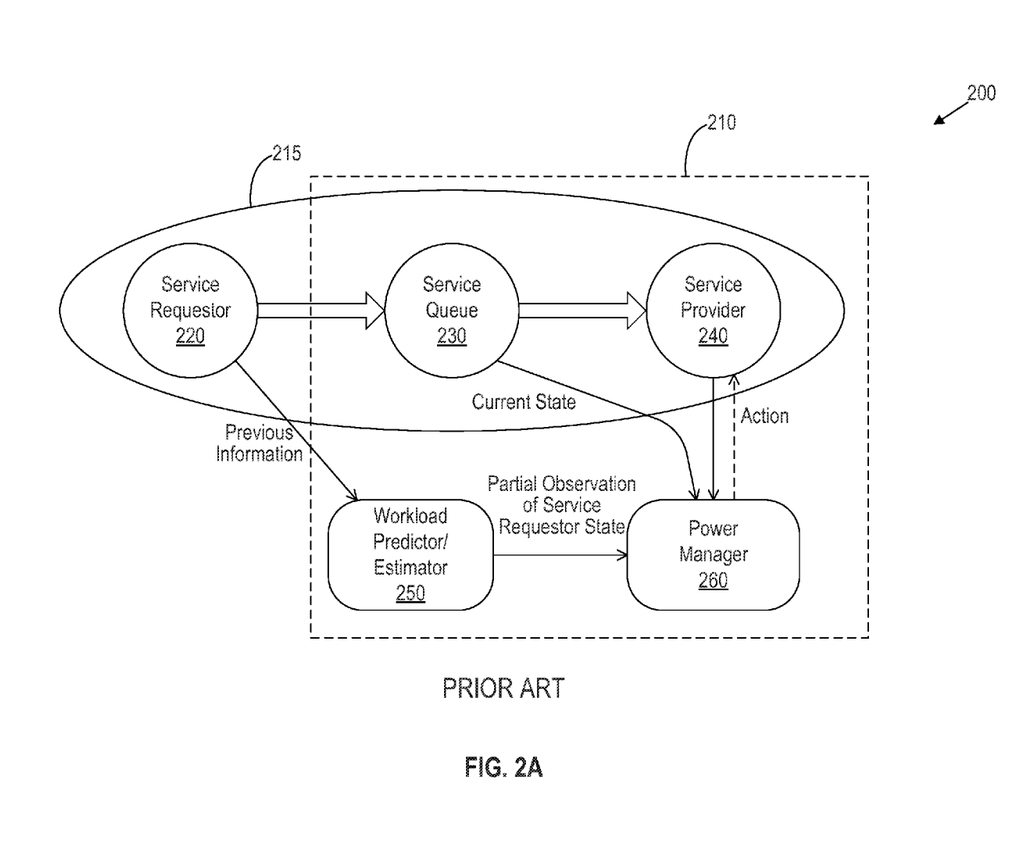
FIG. 2A presents a block diagram of a power management system model.

FIG. 2A presents a block diagram model of a power management system 200. The power management system 200 includes a system 215 and a data storage device (DSD) subsystem 210. The system 215 includes a service requestor 220, a service queue 230, and a service provider 240. The DSD subsystem 210 includes the service queue 230, the service provider 240, a workload predictor/estimator 250, and a power manager 260.

The system 215 may be a single server queue. The service requestor 220 may be a host which requests service, i.e. data reads or writes, from the DSD subsystem 210. The DSD subsystem 210 may be a subsystem which handles power management of a DSD, such as a solid state drive (SSD), solid state hybrid drive (SSHD), or a hard disk drive (HDD), and may be implemented as a logic in a memory connected to a controller. The service queue 230 is a queue of service requests from the service requestor 220. The service queue 230 may be a queue as known in the art, such as a first-in-first-out (FIFO) implemented in a memory of the DSD subsystem 210. The service provider 240 performs the requested services from the service queue 230. The workload predictor/estimator 250 predicts or estimates the workload, which corresponds to an expected size of the service queue 230 within a specified period of time, such as 1 second. The power manager 260 issues commands to manage power settings and/or consumption in the DSD subsystem 210.

The system 215 may operate with the service requestor 220 issuing service requests, which are saved in the service queue 230. The service queue 230 provides the service requests to the service provider 240, which fulfills the requests as they are received from the service queue 230.

The DSD subsystem 210 includes power management features. The service requestor 220 further provides previous information on the workload or service requests to the workload predictor/estimator 250. Based on the previous information, the workload predictor/estimator 250 provides a partial observation of a state of the service requestor 220 to the power manager 260. With this partial state of the service requestor 220 as well as a current state of the service queue 230, the power manager 260 then issues commands or otherwise controls the service provider 240 to efficiently manage energy consumption. For example, the power manager 260 may command the DSD to enter a lower power state when no service requests are expected within a specified period of time. However, the workload predictor/estimator 250 receives input from only the service requestor 220 and may perform better if it received feedback from the system.

Figure 2B:
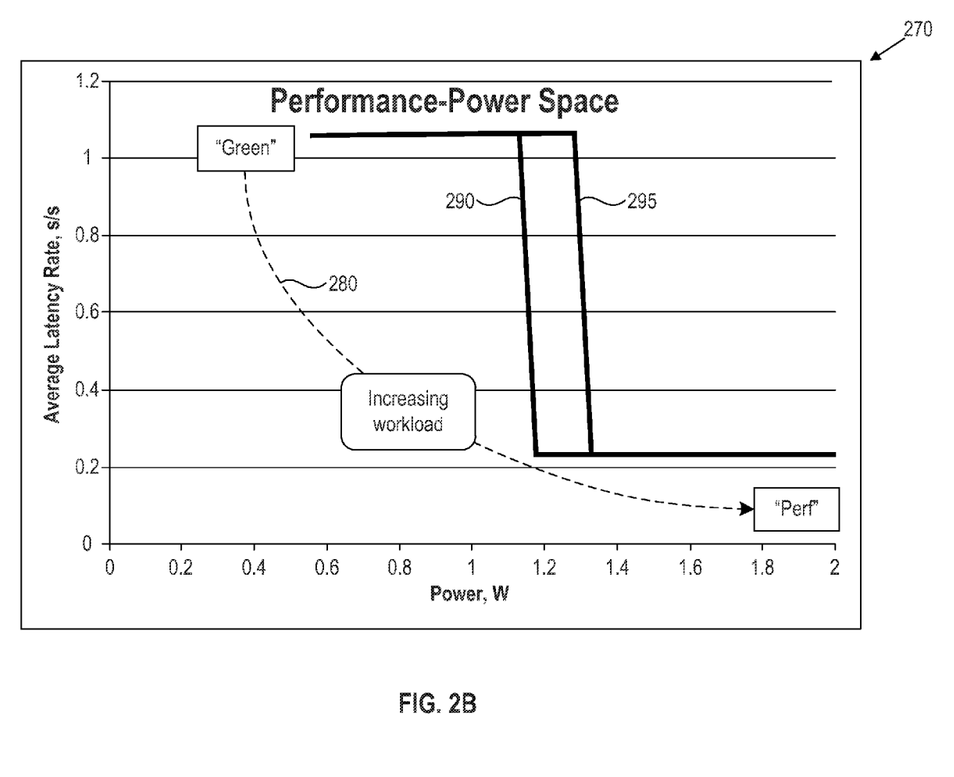
FIG. 2B presents a graph of a performance-power space according to an implementation of the present disclosure.

FIG. 2B presents a conceptual model in a graph 270 of a performance-power space. The graph 270 includes a workload curve 280, a first timer curve 290, and a second timer curve 295. The workload curve 280 shows the relationship between performance and power. In general, as energy consumption is reduced, performance suffers as the average latency increases, as seen in the "green" portion of the workload curve 280. With an increasing workload, performance may be increased, at the cost of increased energy consumption as shown in the "perf" (shorthand for performance) portion of the workload curve 280.

The workload curve 280 may represent a real-world limit or ideal power-performance curve for a system, such as the system 215. The system may choose between two different timers, as depicted by the first timer curve 290 and the second timer curve 295, although in other implementations more or less timers may be used. Both the first timer curve 290 and the second timer curve 295 show that the system generally stays in one mode, such as "green," before quickly transitioning to the other extreme, "perf." Increasing energy consumption without reducing latency leads to a loss of efficiency. In other words, efficiency may be increased by having a timer curve more closely follow the workload curve 280.

Figure 3:
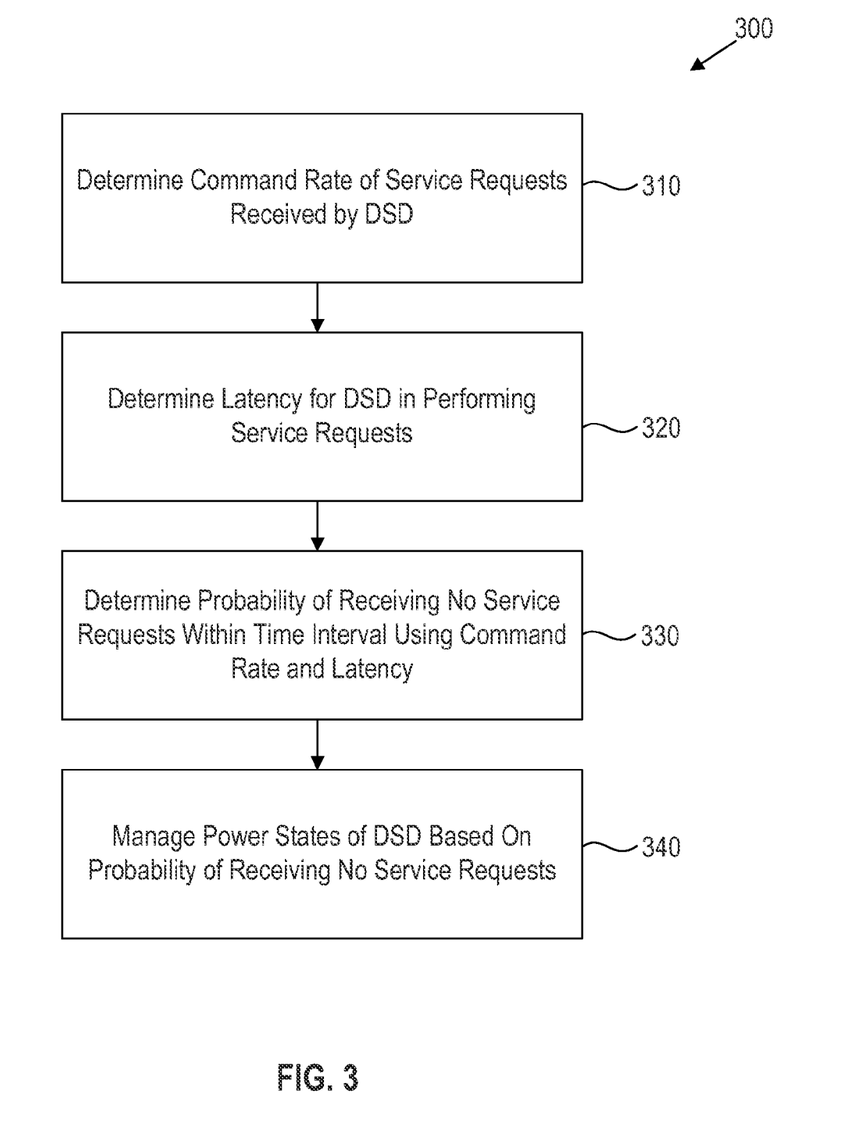
FIG. 3 presents a flowchart of a power management feedback control according to an implementation of the present disclosure.

FIG. 3 presents a flowchart 300 of a power management logic according to an implementation of the present disclosure. The flow may be executed by controller 104 as shown in FIG. 1. At 310, a command rate of service requests received by a DSD is determined, such as the command rate 125 of the DSD 100. At 320, a latency for the DSD in performing service requests is determined, such as the latency 155. At 330, a probability of receiving no service requests within a time interval is determined using the command rate and the latency. At 340, the power states of the DSD are managed based on the probability of receiving no service requests. As described above, the DSD may transition into a lower power state if the probability of receiving no service requests reaches a threshold probability.

Figure 4A:
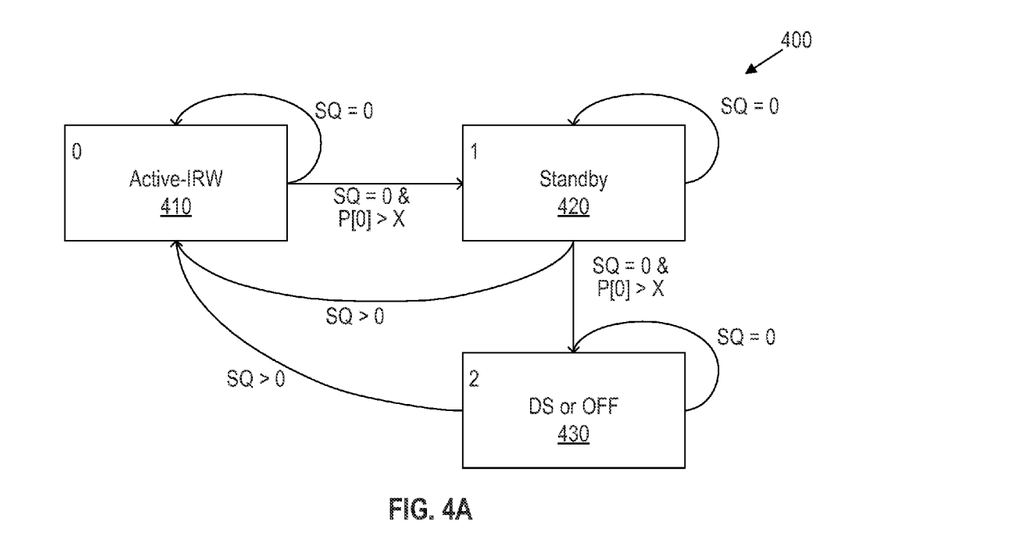
FIG. 4A presents a state diagram of a solid state drive (SSD) according to an implementation of the present disclosure.

FIG. 4A shows a state diagram 400 of a solid state drive having a solid state memory. An active state 410, or state 0, may be a high power state, when the solid state memory may be in an idle, read, or write state. A standby state 420, or state 1, may be a lower power state than the active state 410, such as when the solid state memory is in a standby state. An off state 430, or state 2, may be the lowest power state of the three states, such as when the solid state memory is in a device sleep or off state. Although more power states are possible, the present disclosure will only discuss three states.

The state diagram 400 illustrates a simplified logic of how a controller, such as controller 104, determines whether to change states. However, the state diagram 400 does not describe the timers used between state changes, which will be discussed further below.

When in the active state 410, the controller determines whether the service queue is empty (SQ=0), and whether the probability P[0] that no events (i.e., 0 service requests) will occur in the time period is greater than a threshold probability (X). Even if the service queue is empty, the controller may stay in the active state 410 if the probability of an event occurring is greater than the threshold probability. However, if the service queue is empty and there is sufficient probability that no events will occur, the controller transitions to the standby state 420.

The controller will transition back to the active state 410 if the service queue is not empty. Otherwise, the controller will again check the probability that 0 events will occur. If the probability of 0 events is below the threshold probability, X, the controller will stay in the standby state 420, for faster transition back to the active state 410 (as compared to the off state 430). If the service queue is empty and the probability of 0 events exceeds the threshold probability, the controller transitions to the off state 430.

If the service queue is no longer empty, the controller will transition back to the active state 410. If the service queue remains empty, the controller will stay in the off state 430.

Figure 4B:
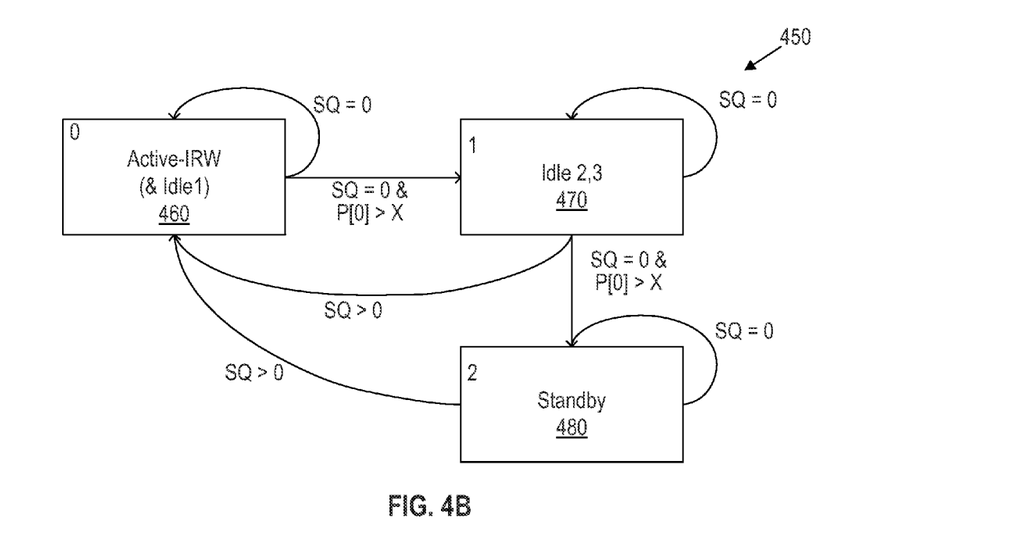
FIG. 4B presents a state diagram of a hard disk drive (HDD) according to an implementation of the present disclosure.

FIG. 4B shows a state diagram 450 of a HDD or other hard disk storage. Similar to the state diagram 400, the state diagram 450 illustrates a simplified logic without considering timers, and represents a state machine that can be implemented, for example, in controller 104. An active state 460, or state 0, may be a high power state, such as an IRW (idle, read, write) state or an Idle1 state. An idle state 470, or state 1, may include one or more lower power states than the active state 460, such as an idle2 state and an idle3 state. A standby state 480, or state 2, may be the lowest power state of the three states, such as a standby, sleep, or off state. The three states have various power states of the HDD grouped together, such as the active state 460 including Active-IRW and Idle1 states, and the idle state 470 including Idle2 and Idle3 states. In other implementations, each state may be separately considered.

When in the active state 460, the controller determines whether the service queue is empty (SQ=0), and whether the probability (P[0]) that 0 events (service requests) will occur in the time period is greater than a threshold probability (X). Even if the service queue is empty, the controller will stay in the active state 460 if the probability of an event occurring is greater than the threshold probability. However, if the service queue is empty and there is sufficient probability that no events will occur, the controller transitions to the idle state 470.

The controller will transition back to the active state 460 if the service queue is not empty. Otherwise, the controller will check the probability that 0 events will occur. If the probability of 0 events is less than the threshold probability, the controller will stay in the idle state 470, for faster transition back to the active state 460 (as compared to the standby state 480). If the service queue is empty and the probability of 0 events exceeds the threshold probability, the controller transitions to the standby state 480.

If the service queue is no longer empty, the controller will transition back to the active state 460. If the service queue remains empty, the controller will stay in the standby state 480.

Figure 5A:
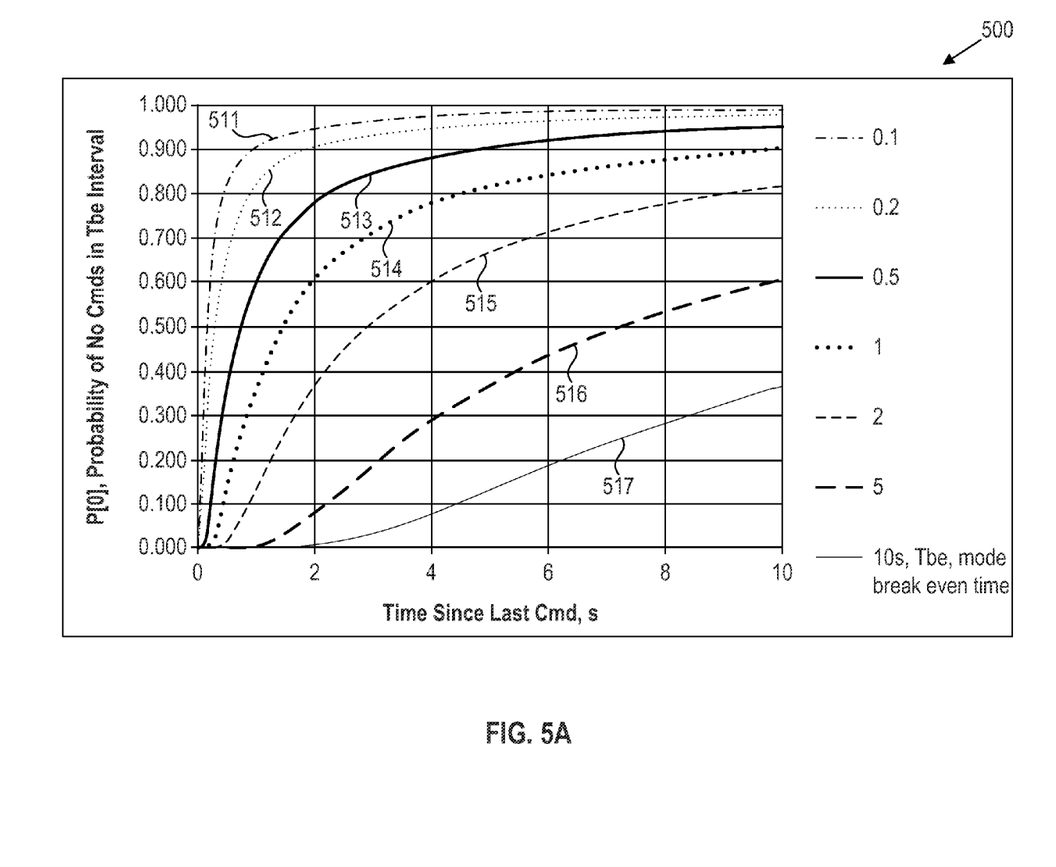
FIG. 5A presents a graph of probabilities of no commands during a time period according to an implementation of the present disclosure.

FIG. 5A shows a graph 500 of probabilities (P[0]) that no commands will arrive in a future break even interval over time since the last command arrived. A first curve 511 shows that with a break even time of 0.1 seconds, the probability rises quickly. Similarly, a second curve 512 with a break even time of 0.2 seconds and a third curve 513 with a break even time of 0.5 seconds exhibit similar rise in probability, though less steep. As the break even times increase, the probabilities tend to rise more slowly. A fourth curve 514 with a break even time of 1 second, and a fifth curve 515 with a break even time of 2 seconds rise more slowly, and does not reach as high probabilities. A sixth curve 516 with a break even time of 5 seconds does not quite reach a probability of about 0.400 after 4 seconds. A seventh curve 517 with a break even time of 10 seconds reaches a probability slightly more than about 0.350 after 10 seconds. As seen in FIG. 5A, the probabilities are reduced as the break even time increases.

Figure 5B:
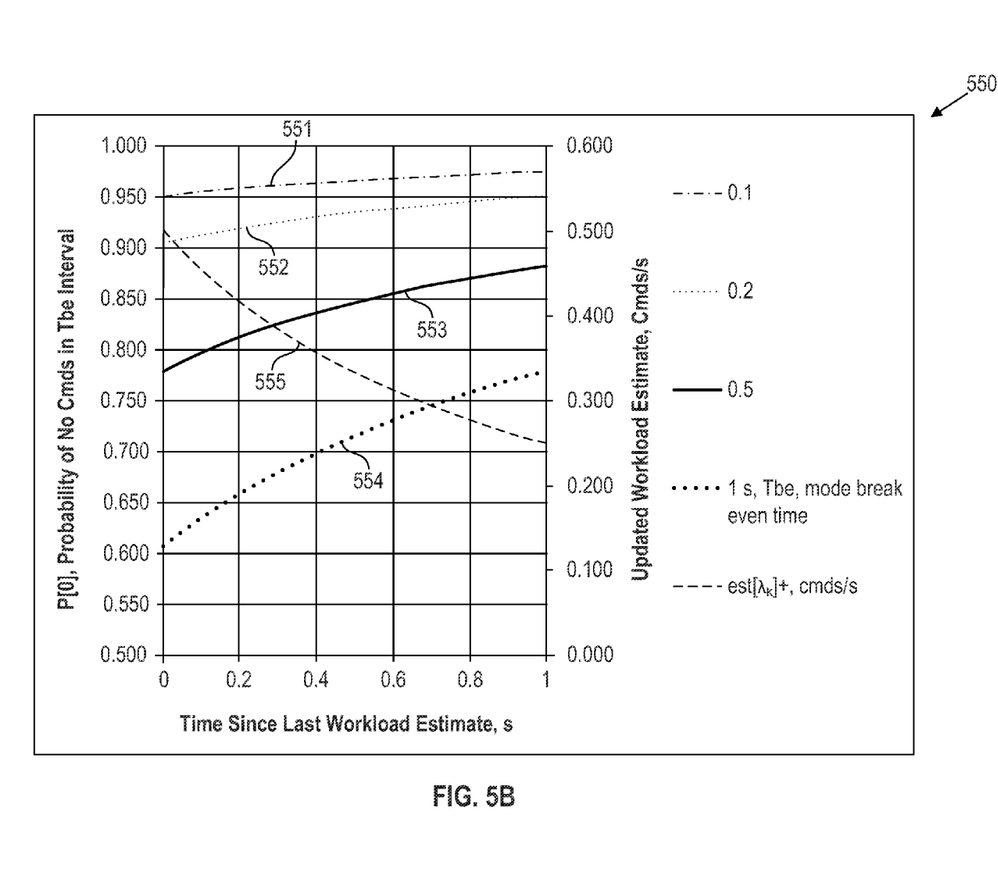
FIG. 5B presents a graph of probabilities of no commands during a time period according to an implementation of the present disclosure.

FIG. 5B illustrates a graph 550 of P[0], the probability that no commands (service requests) arrive within a specified time period or interval, which is 1 second in the example shown in graph 550. P[0] may be used in Equation 2 above. The break even time, $T_{be}$, corresponds to the time needed for a power mode state transition. A first curve 551, using a break even time of 0.1 seconds, shows a high probability of no commands within the interval, which slowly rises as time passes from the previous workload estimate. A second curve 552, using a break even time of 0.2 seconds, exhibits a similar rise. A third curve 553, using a break even time of 0.5 seconds, starts at a lower probability, but rises a little more quickly. A fourth curve 554, using a break even time of 1 second, starts at a lower probability, but has a steeper rise over time. In other words, as the system remains idle (i.e. no commands arrive), the probability that no commands will arrive also increases gradually. In a similar vein, an estimate curve 555 of an estimated command rate starts high, but gradually reduces over time.

The counter value may be set based on the appropriate curve for a given break even time. For example, looking at the third curve 553 with a break even time of 0.5 seconds, if 85% probability is the threshold, then the counter may be set to approximately 0.5 seconds where the third curve 553 reaches 0.850. By setting the counter to 0.5 seconds, the power manager state machine 150 waits for the counter to expire before switching to a lower power state. If no commands are received by then, the power manager state machine 150 assumes it can safely transition to the lower power state. In other words, the power manager state machine 150 waits until a sufficiently high probability of receiving no commands is reached before transitioning to a lower power state. If the curve does not intersect the threshold probability, then the power manager state machine 150 will wait for the next time interval. Shorter break even times and longer times since the last estimate tend to reduce this delay in switching states.

Figure 6:
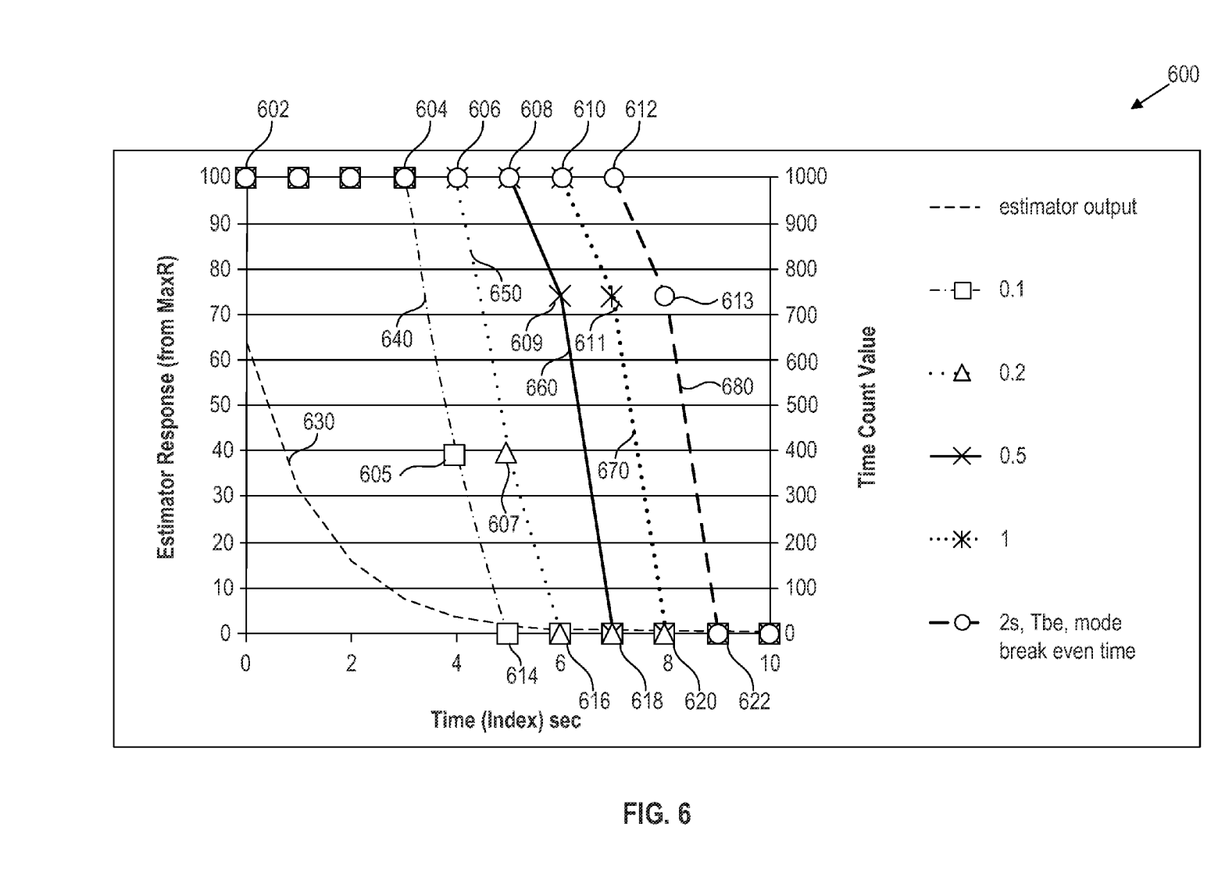
FIG. 6 presents a graph of counter values according to an implementation of the present disclosure.

FIG. 6 presents a graph 600 of counter values, which may be used by the timer 160, for example, to interpolate counter values from the $n_k$ equation (Equation 2) above. An estimate curve 630 corresponds to an estimator response. A first curve 640 uses a break even time of 0.1 seconds. A second curve 650 uses a break even time of 0.2 seconds. A third curve 660 uses a break even time of 0.5 seconds. A fourth curve 670 uses a break even time of 1 second. A fifth curve 680 uses a break even time of 2 seconds.

The following description primarily traces through the example curve 640 with a break even time of 0.1 seconds. From 0 to 4 seconds, the estimator curve 630 is high, although relaxing. Accordingly, the timer is set at a value 602 of 1000, which may be a maximum timer value. This is done for all the curves with different break even times, including curve 640. Because no state transitions will occur in this time interval, the timer 160 may be set to the maximum to wait out the entire interval.

After three intervals pass, the timer is set to a value 604, which may also be the maximum timer value. However, at the next time interval, the estimator curve 630 has relaxed enough that if the current state transition had a break even time of 0.1 seconds (follow curve 640), the timer 160 would be set to a value 605. The value 605 may be 390. The timer 160 waits 0.390 seconds. If no commands arrived during that 0.390 second time period, the power manager state machine 150 transitions to a lower power state. On subsequent intervals, the timer 160 may be set to a value 614 of 0, a value 616 of 0, a value 618 of 0, a value 620 of 0, and a value 622 of zero. In other words, the timer 160 is not used. With a different state transition, the break even time may change.

Moving onto the next curve 650 when the break even time is 0.2 seconds, the timer 160 is set to a value 606 of 1000, at the fifth interval. At the next interval, the timer 160 is set to a value 607, following the second curve 650. The value 607 may also be 390, meaning the power manager state machine 150 waits for the timer 160 to expire after 0.390 seconds before transitioning to a lower power state if no commands have arrived. On subsequent intervals, the timer 160 may be set to the value 616, the value 618, and so on.

As the break even times become longer, the amount of time waited before transitioning to a lower power state generally increases, such as increasing the number of intervals waited before assigning a timer value, and increasing the timer value. At a break even time of 0.5 seconds, the timer 160 is set to a value 608, which may be 1000, at the sixth interval. Following the third curve 660, at the next interval the timer 160 is set to a value 609, which may be 730. In other words, the power manager state machine 150 waits 0.730 seconds before transitioning to a lower power state. With a break even time of 1 second, the timer 160 may be set to a value 610, which may be 1000, at the seventh interval. Following the fourth curve 670, at the next interval the timer 160 is set to a value 611, which may be 730. With a break even time of 2 seconds, the timer 160 may be set to a value 612, which may be 1000, at the eighth interval. Following the fifth curve 680, at the next interval the timer 160 is set to a value 613, which may be 730. After the state transition, the timer 160 may be accordingly set to 0 values, such as the value 618, the value 620, and/or the value 622.

Figure 7:
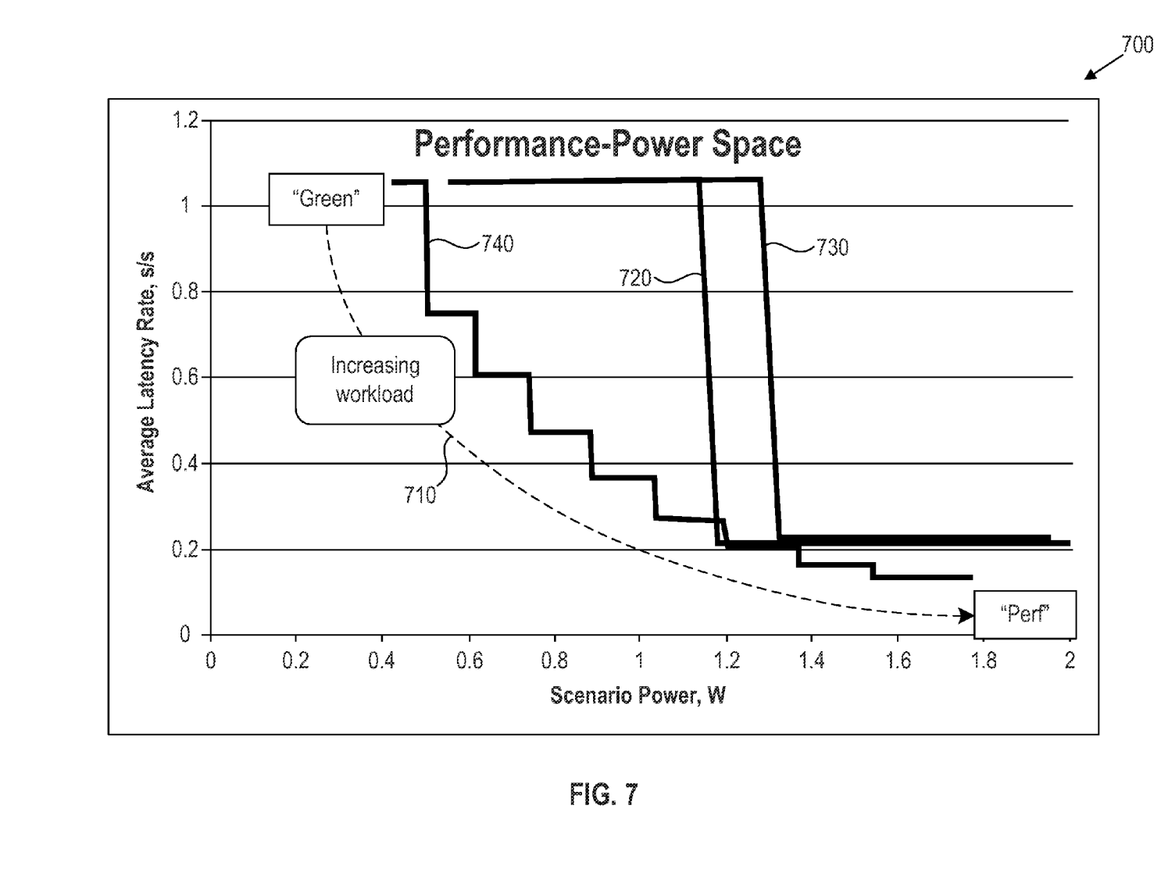
FIG. 7 presents a graph of a performance-power space according to an implementation of the present disclosure.

FIG. 7 shows a conceptual model in a graph 700 of a performance-power space. The graph 700 is similar to the graph 270 in FIG. 2B and includes a workload curve 710 (similar to the workload curve 280), a first timer curve 720 (similar to the first timer curve 290), and a second timer curve 730 (similar to the second timer curve 295). A third timer curve 740 shows how the feedback system described above increases efficiency by more closely following the workload curve 710.

Figure 8:
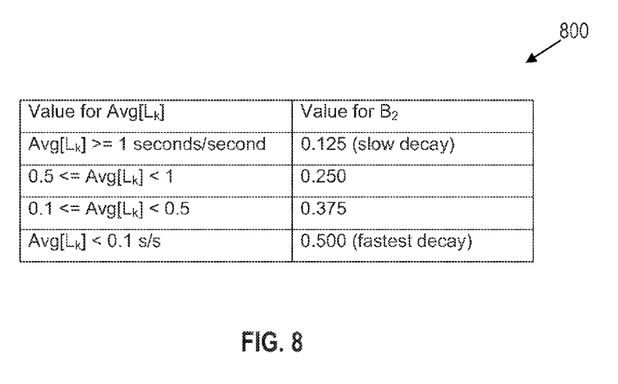
FIG. 8 presents a table of values used in an implementation of the present disclosure.

FIG. 8 presents a table 800, showing values for average latency and $B_2$, as explained above. The table 800 is similar to the Table 1 above.

Figure 9A:
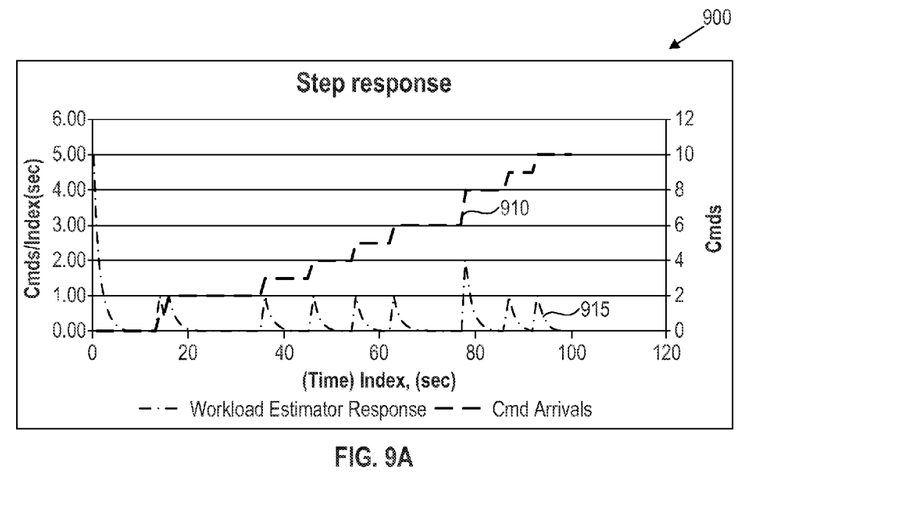
FIG. 9A presents a graph of estimator responses according to an implementation of the present disclosure.
Figure 9B:
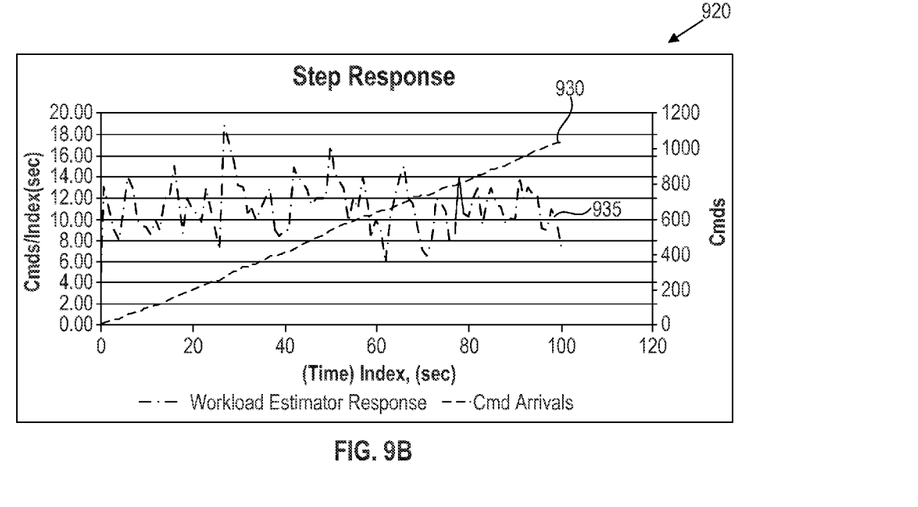
FIG. 9B presents a graph of estimator responses according to an implementation of the present disclosure.
Figure 9C:
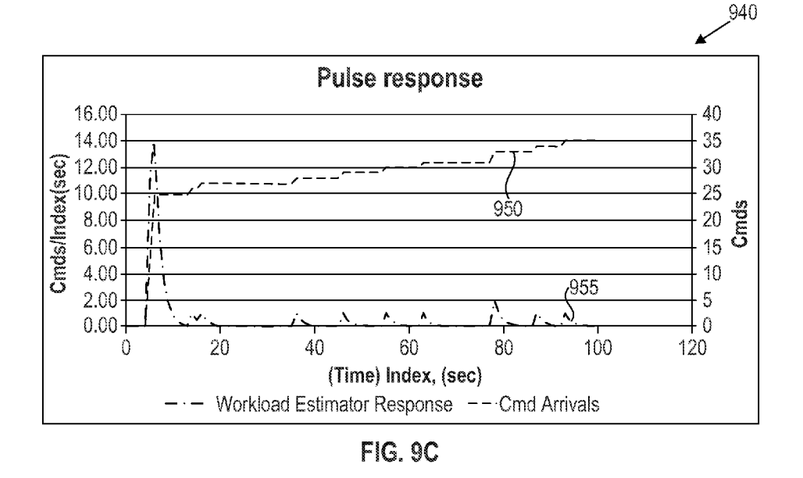
FIG. 9C presents a graph of estimator responses according to an implementation of the present disclosure.
Figure 9D:
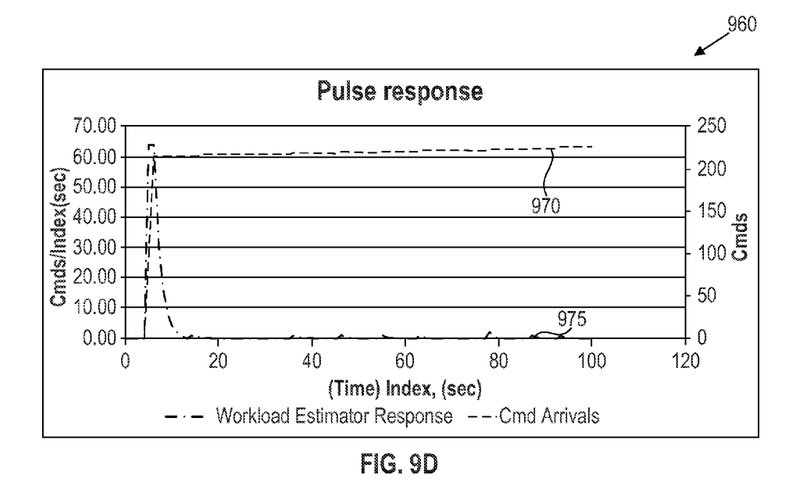
FIG. 9D presents a graph of estimator responses according to an implementation of the present disclosure.

FIGS. 9A-9D show graphs of estimator responses to different example counts of incoming commands, with MaxR set to 64 commands/second and $B_2$ set at 0.5. FIG. 9A shows a step from a high rate to a low rate. FIG. 9B shows a step from a low rate to a high rate. FIGS. 9C and 9D show a pulse or spike in the number of incoming commands. In each of FIGS. 9A-9D, the number of incoming commands for a command curve is provided on the right side of the graph (Cmds) and the estimated rate of commands for an estimator curve is provided on the left side of the graph (Cmds/Index(sec)).

In FIG. 9A, a graph 900 includes a command curve 910 which shows a cumulative count of commands that have arrived, at a rate stepping from 5 to 0.1 commands/second. An estimator curve 915 represents a workload estimator response, which is an estimate of the command rate. The estimator curve 915 therefore estimates a slope of the command curve 910. As commands arrive, the estimator curve 915 spikes before relaxing until the next command arrives. Changing $B_2$ can alter the rate at which the response relaxes.

FIG. 9B shows a graph 920 including a command curve 930, having a rate stepped from 5 (at time<0) to 10 commands/second, and an estimator curve 935. As seen in FIG. 9B, the general slope of the command curve 930 is about 10. The estimator curve 935 fluctuates near 10.00, albeit with spikes or noise due to the asymmetric nature of the estimation. For example, if the incoming command rate is higher, the estimation will use the higher rate (causing a spike in the estimator curve 935), before relaxing again.

FIG. 9C shows a graph 940 with a command curve 950, exhibiting a pulse going from 0.1 to 10 to 0.1 commands/second, and an estimator curve 955. The pulse in the command rate causes an initial spike in the estimator curve 955, before it relaxes.

FIG. 9D shows a graph 960 with a command curve 970, exhibiting a pulse going from 0.1 to 100 to 0.1 commands/second, and an estimator curve 975. Similar to the estimator curve 955 in FIG. 9C, the estimator curve 975 in FIG. 9D shows an initial spike. However, the spike is clipped at a maximum rate, which may be 64.00. In other implementations, the maximum rate may be another appropriate value, which may be optimized through empirical tests. If the estimator curve 975 spikes too high, the time to relax would be too great to effectively manage power states. As the estimator curves 915, 935, 955, and 975 show, the estimator biases weight more towards recent information on recent incoming commands than for older information on older incoming commands.

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example implementations is provided to enable any person of ordinary skill in the art to make or use the implementations in the present disclosure. Various modifications to these examples will be readily apparent to those of ordinary skill in the art, and the principles disclosed herein may be applied to other examples without departing from the spirit or scope of the present disclosure. The described implementations are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A data storage device (DSD) comprising:
   a storage medium configured to operate in a first power state and a second power state;
   a memory configured to store a service queue of service requests to access the storage medium; and
   a controller configured to:
      perform one or more of the service requests in the service queue;
      determine a command rate of service requests received by the DSD;
      determine an average latency in performing the one or more service requests;
      calculate an estimated command rate based at least on the determined command rate and using the average latency as feedback to control a rate of decay of the estimated command rate;
      determine a timer interpolation value based at least on the estimated command rate and a probability of the DSD receiving no service requests within a time interval; and
      determine when to transition between the first power state and the second power state based on the timer interpolation value.

2. The DSD of claim 1, wherein the first power state comprises a high power state and the second power state comprises a low power state.

3. The DSD of claim 1, wherein the controller is further configured to use a counter to determine the command rate.

4. The DSD of claim 1, wherein the controller is further configured to set, based on the timer interpolation value, timer values for an amount of time to wait without receiving a service request before transitioning between power states of the storage medium.

5. The DSD of claim 1, wherein the storage medium comprises a hard disk.

6. The DSD of claim 1, wherein the storage medium comprises a solid state memory.

7. The DSD of claim 1, wherein the controller is further configured to determine the probability that no service requests will arrive within the time interval based on a Poisson distribution.

8. The DSD of claim 1, wherein the time interval corresponds to a break even time needed to transition between the first power state and the second power state.

9. The DSD of claim 1, wherein the controller is further configured to determine a threshold based on a desired probability of receiving no service requests within the time interval and to transition from the first power state to the second power state when the threshold is met.

10. A method for managing energy consumption in a data storage device (DSD), the method comprising:
- determining a command rate of service requests received by the DSD;
- determining an average latency in performing the one or more service requests;
- calculating an estimated command rate based at least on the determined command rate and using the average latency as feedback to control a rate of decay of the estimated command rate;
- determining a timer interpolation value based at least on the estimated command rate and a probability of receiving no service requests within a time interval; and
- determining when to transition between power states of the DSD based on the timer interpolation value to.

11. The method of claim 10, further comprising:
- setting, based on the timer interpolation value, timer values for an amount of time to wait without receiving a service request before transitioning between power states of the storage medium; and
- switching between the power states based on the timer values.

12. The method of claim 10, wherein determining the probability of receiving no service requests further comprises using a Poisson distribution.

13. The method of claim 10, wherein the time interval corresponds to a break even time needed to transition between a first power state and a second power state.

14. The method of claim 10, further comprising:
- determining a threshold based on a desired probability of receiving no service requests within the time interval; and
- transitioning the DSD from a first power state to a second power state when the threshold is met.

15. A non-transitory computer-readable medium storing computer executable instructions for managing energy consumption in a data storage device (DSD), wherein when the computer executable instructions are executed by a controller, the computer executable instructions cause the controller to:
- determine a command rate of service requests received by the DSD;
- determine an average latency in performing the one or more service requests;
- calculate an estimated command rate based at least on the determined command rate and using the average latency as feedback to control a rate of decay of the estimated command rate;
- determine a timer interpolation value based at least on the estimated command rate and a probability of the DSD receiving no service requests within a time interval; and
- determine when to transition between the first power state and the second power state based on the timer interpolation value.

* * * * *